US012752642B2

(12) United States Patent
Ueno et al.

(10) Patent No.: US 12,752,642 B2
(45) Date of Patent: Oct. 6, 2026

(54) ENERGY ABSORBER

(71) Applicant: TOYOTA JIDOSHA KABUSHIKI KAISHA, Toyota (JP)

(72) Inventors: Kouichirou Ueno, Nagoya (JP); Takuya Inoue, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 381 days.

(21) Appl. No.: 18/539,479

(22) Filed: Dec. 14, 2023

(65) Prior Publication Data

US 2024/0300341 A1 Sep. 12, 2024

(30) Foreign Application Priority Data

Mar. 6, 2023 (JP) ................................ 2023-033996

(51) Int. Cl.
*B60L 50/64* (2019.01)

(52) U.S. Cl.
CPC .................................. *B60L 50/64* (2019.02)

(58) Field of Classification Search
CPC ......... B60L 50/64; F16F 7/121; B60J 5/0451; B60J 5/04; B60J 5/0412; B60J 5/0413; B60J 5/0416; B60J 5/0452; B60J 5/0425; B60R 21/04; B60R 21/0428
See application file for complete search history.

(56) References Cited

U.S. PATENT DOCUMENTS 6,682,128 B2 * 1/2004 Carroll, III .......... B65D 81/127 293/133
8,474,583 B2 * 7/2013 Nagwanshi ............. B60R 19/34 188/371
8,807,303 B2 * 8/2014 Fukuo ..................... F16F 7/121 188/377
9,688,123 B2 * 6/2017 Hasegawa .............. B60J 5/0451
2003/0030290 A1 * 2/2003 Yamagiwa ............... B62J 27/30 280/219
2007/0200376 A1 * 8/2007 Jaarda ..................... B60R 19/18 293/120
2012/0152674 A1 * 6/2012 Fukuo ..................... F16F 7/121 188/377
2014/0322484 A1 * 10/2014 Teshima ................ B29C 70/462 428/116
2022/0006151 A1 * 1/2022 Foran ...................... B60L 58/26

FOREIGN PATENT DOCUMENTS

JP 2011-021673 A 2/2011
WO 2013/080974 A1 6/2013
WO 2015/136476 A1 9/2015
WO 2020/247751 A1 12/2020

* cited by examiner

*Primary Examiner* — Vishal R Sahni
(74) *Attorney, Agent, or Firm* — SoraIP, Inc.

(57) ABSTRACT

The energy absorber includes a body portion that is formed of resin and is assembled into a metal closed space of a vehicle; a plurality of energy absorbers are provided on the body portion, and when the body portion is assembled to the vehicle, the energy absorber has an opening on the outside in the vehicle width direction; A cell having a lower surface having a downward slope of three degrees or more from one end on the inside in the vehicle width direction to the other end on the outside in the vehicle width direction when viewed from the rear side of the vehicle.

2 Claims, 4 Drawing Sheets

ENERGY ABSORBER

CROSS-REFERENCE TO RELATED APPLICATION

This application claims priority to Japanese Patent Application No. 2023-033996 filed on Mar. 6, 2023 incorporated herein by reference in its entirety.

BACKGROUND

1. Technical Field

The present disclosure relates to an energy absorber.

2. Description of Related Art

In recent years, it has been desired to increase the space for mounting a battery in a vehicle, in order to extend the cruising range of battery electric vehicles, for example. Therefore, there is a movement to secure, as a space for mounting a battery, an empty space created by incorporating an energy absorber, mounted outside a rocker as a metal closed space of a vehicle, into the rocker. WO 2020/247751 discloses a technology in which a resin energy absorber is provided in a metal closed space of a vehicle, in order to absorb energy in the event of a side collision with the vehicle. The energy absorber described in WO 2020/247751 has a plurality of hexagonal cells having openings on the outer side in the vehicle width direction.

SUMMARY

When the energy absorber is incorporated into the rocker as described above, it is necessary to incorporate the energy absorber into the rocker before electrocoating on the vehicle, and therefore the energy absorber is to pass through an electrodeposition coating line. When the cells provided in the energy absorber have an opening on the outer side in the vehicle width direction as described in WO 2020/247751, an electrodeposition solution may remain inside the cells when the vehicle passes through the electrodeposition coating line.

The present disclosure has been made in consideration of the above fact. An object of the present disclosure is to obtain an energy absorber capable of suppressing an electrocoating solution remaining inside cells when a vehicle passes through an electrodeposition coating line.

An energy absorber according to an aspect of the present disclosure includes:

- a body portion made of a resin and assembled in a metal closed space of a vehicle; and
- a plurality of cells provided in the body portion and including an opening on an outer side in a vehicle width direction with the body portion assembled to the vehicle, the cells each including a lower surface with a downward slope of three degrees or more from one end portion on an inner side in the vehicle width direction toward the other end portion on the outer side in the vehicle width direction as seen from a rear side of the vehicle.

With the above configuration, a plurality of cells provided in the body portion includes an opening on an outer side in a vehicle width direction with the body portion assembled to the vehicle, and the cells each include a lower surface with a downward slope of three degrees or more from one end portion on an inner side in the vehicle width direction toward the other end portion on the outer side in the vehicle width direction as seen from a rear side of the vehicle. Therefore, an electrodeposition solution is discharged from the inside of the cells because of the lower surface with a downward slope of three degrees or more when the vehicle passes through an electrodeposition coating line. Consequently, it is possible to suppress the electrodeposition solution remaining inside the cells.

In the above aspect, the lower surface of each of the cells may include different downward slopes from the one end portion toward the other end portion, and may include a greater downward slope on the outer side in the vehicle width direction than on the inner side in the vehicle width direction.

With the above configuration, the lower surface of each of the cells includes different downward slopes from the one end portion toward the other end portion, and includes a greater downward slope on the outer side in the vehicle width direction than on the inner side in the vehicle width direction. Therefore, the cells each include a greater downward slope on the opening side. This facilitates discharge of the electrodeposition solution.

In the above aspect, the downward slope of the lower surface may be set to be changed stepwise.

With the above configuration, the downward slope of the lower surface of each of the cells is set to be changed stepwise. Therefore, it is possible to easily discharge the electrodeposition solution while maintaining the strength of the cells, depending on the thickness of the lower wall constituting the lower surface.

In the above aspect, the downward slope of the lower surface may be set to be changed gradually.

With the above configuration, the downward slope of the lower surface of each of the cells is set to be changed gradually. Therefore, it is possible to easily discharge the electrodeposition solution while maintaining the strength of the cells, depending on the thickness of the lower wall constituting the lower surface.

In the above aspect, the downward slope of the lower surface may be set uniformly.

With the above configuration, the downward slope of the lower surface of the cells is set uniformly. Therefore, the electrodeposition solution can be smoothly discharged along the lower surface of each of the cells.

As described above, the energy absorber according to the present disclosure has the excellent effect of suppressing the electrodeposition solution remaining inside the cells when the vehicle passes through the electrodeposition coating line.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
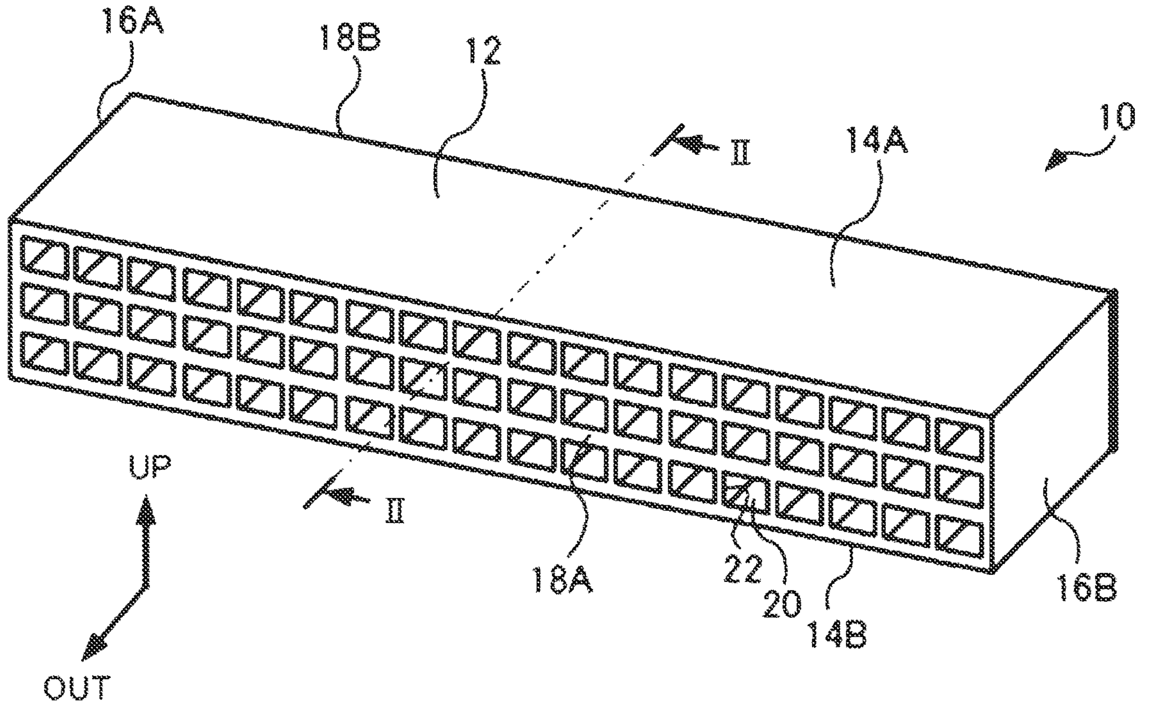
FIG. 1 is a perspective view of an energy absorber according to a first embodiment of the present disclosure when it is assembled into a vehicle and viewed from diagonally above the outside of the vehicle.

Hereinafter, the energy absorber based on a first embodiment of this disclosure is demonstrated using FIGS. 1 to 5. Note that the arrow UP shown as appropriate in each figure indicates the upper side of the vehicle in the vertical direction. The arrow OUT shown as appropriate in each figure indicates the outside in the vehicle width direction. Further, in each figure, only some of the reference numerals are shown in order to make the drawings easier to read. In each figure, other parts are omitted in favor of ease of viewing the drawings.

Configuration of Energy Absorber 10

As shown in FIG. 1, the energy absorber 10 includes a substantially rectangular parallelepiped body portion 12 made of resin. The body portion 12 is assembled into a metal closed space such as a rocker member (not shown) of a vehicle (not shown). In the vehicle assembled state, the body portion 12 has an upper surface 14A and a lower surface 14B in the vehicle vertical direction, a front surface 16A and a rear surface 16B in the vehicle longitudinal direction, and an outer surface 18A and an inner surface 18B in the vehicle width direction.

A plurality of cells 20 each having an opening 22 are provided on the outer surface 18A of the body portion 12. When the body portion 12 of the energy absorber 10 is assembled into the metal closed space, it is assembled so that the opening 22 is located on the outside in the vehicle width direction in the vehicle assembled state.

In this embodiment, specifically, 18 openings 22 are provided in the vehicle longitudinal direction, and three stages are provided in the vehicle vertical direction. That is, a total of 54 openings 22 are provided.

Figure 2:
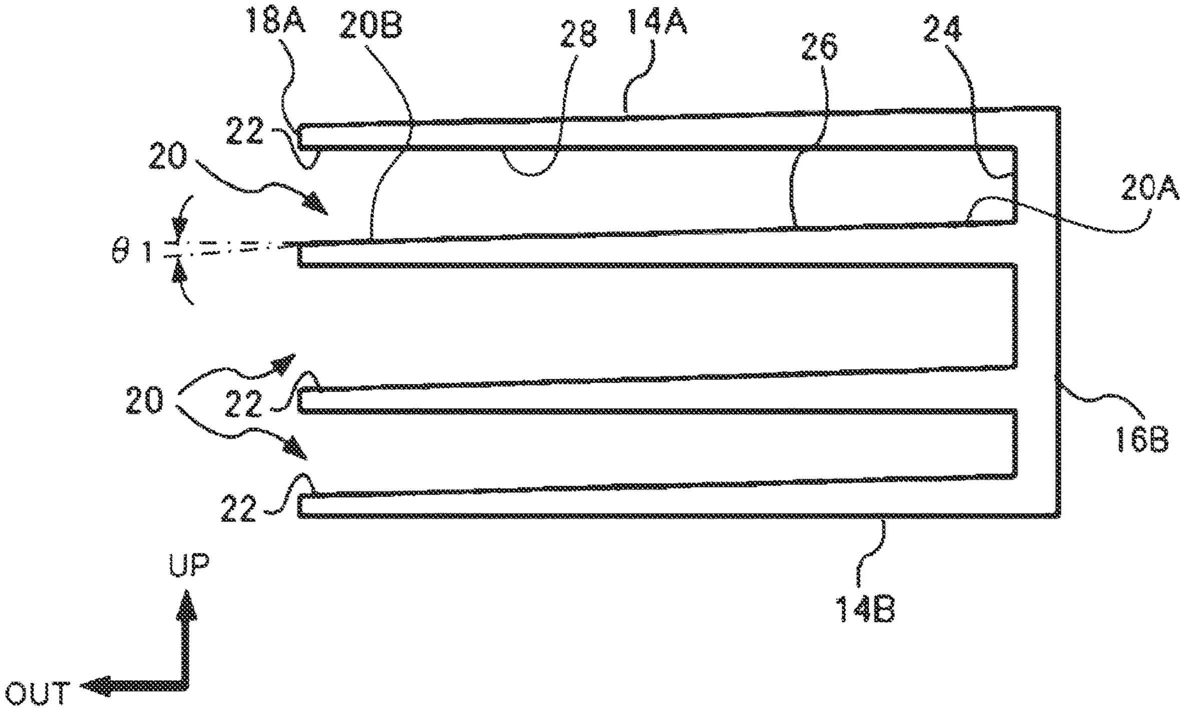
FIG. 2 is a cross-sectional view taken along line II-II in FIG. 1, viewed from the rear side of the vehicle.

As shown in FIG. 2, when viewed from the rear side of the vehicle in the vehicle assembled state, the cell 20 has a bottom surface 24 on the inside in the vehicle width direction, a lower surface 26 on the lower side, and an upper surface 28 on the upper side. The lower surface 26 of the cell 20 is formed to have a downward slope of an angle θ1 or more from the inner one end portion 20A in the vehicle width direction toward the outer other end portion 20B (opening 2 side). In this embodiment, the angle θ1 is three degrees.

In this embodiment, as an example, the lower surface 26 is formed in a flat shape. Further, as an example, the downward slope of the lower surface 26 is uniformly set to three degrees. Further, in this embodiment, as an example, like the lower surface 26 of the cell 20, the upper surface 14A of the body portion 12 is also formed with a downward slope of three degrees.

Measurement of Residual Water Rate of Energy Absorber 10

Figure 3:
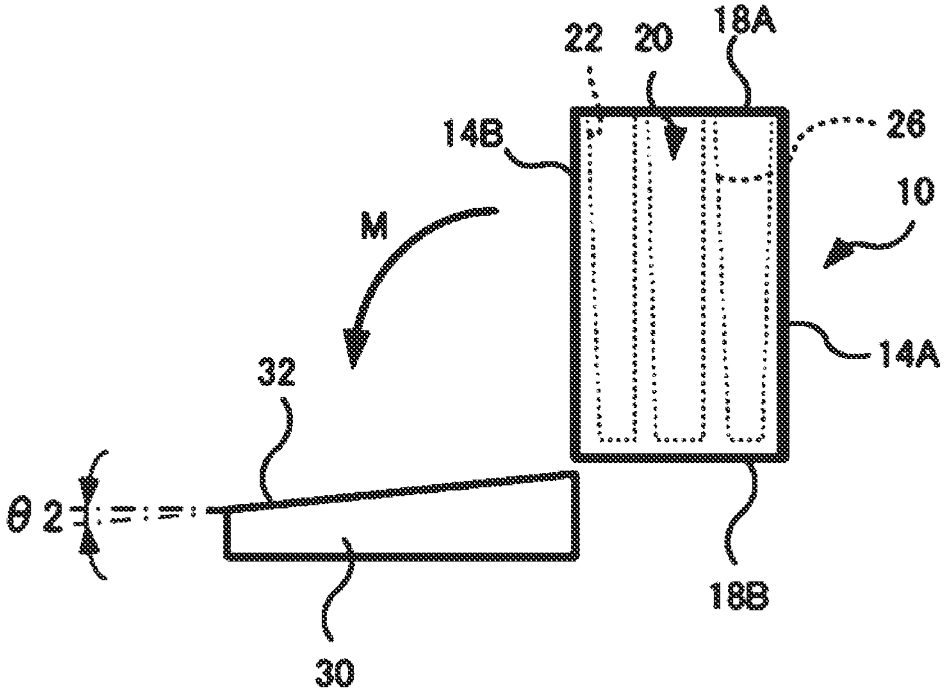
FIG. 3 is a schematic diagram schematically showing a state in which the inside of the cell of the energy absorber of FIG. 1 is filled with water and placed.
Figure 4:
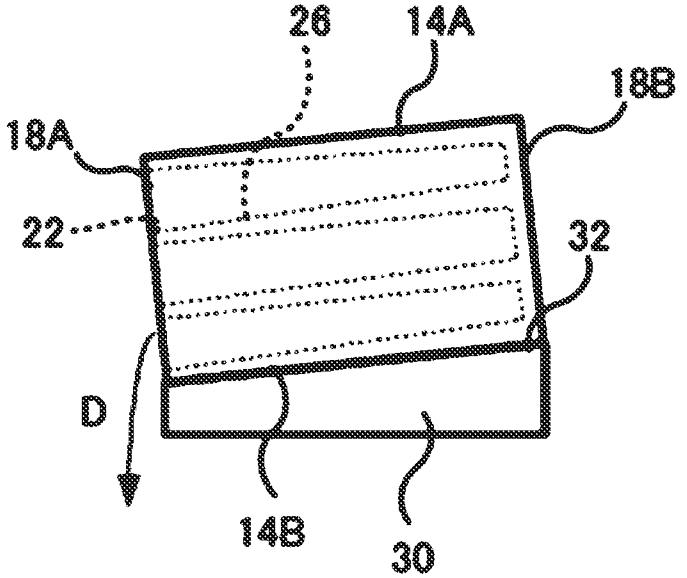
FIG. 4 is a schematic diagram schematically showing a state in which the water inside the cell is discharged by rotating the state in FIG. 3.

Next, measurement of residual water percentage using the energy absorber 10 configured as described above will be explained. In this embodiment, as shown in FIG. 3, first, the inside of the cell 20 was filled with water, that is, the residual water rate was 100%, with the opening 22 of the cell 20 positioned upward. Then, the energy absorber 10 with the cell 20 filled with water was rotated in the direction of arrow M so that the lower surface 14B of the body portion 12 was positioned downward. At this time, as shown in FIGS. 3 and 4, a jig 30 having an inclination in advance was used. The upper surface 32 of the jig 30 has an inclination of an angle θ2. The angle θ2 is variable.

In this embodiment, the energy absorber 10 was placed on the jig 30 such that the lower surface 14B of the body portion 12 was in contact with the upper surface 32 of the jig 30. At this time, the upper surface 32 of the jig 30 was installed so that the opening 22 of the cell 20 was positioned below.

Figure 5:
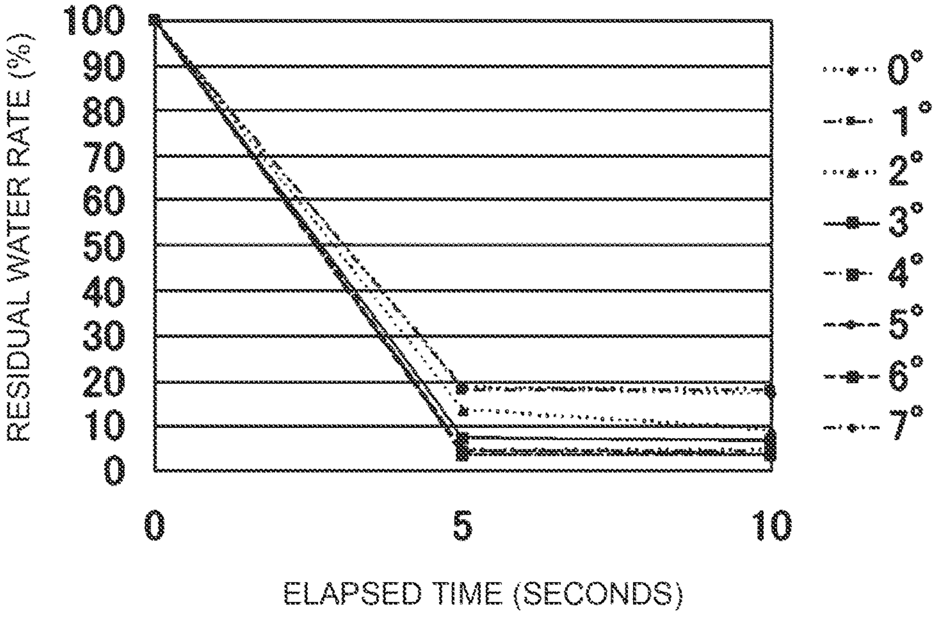
FIG. 5 is a graph showing the relationship between the elapsed time in the state of FIG. 3 and the residual water percentage inside the cell for each angle.

As shown in FIG. 4, when the energy absorber 10 was placed on the jig 30, water was discharged from the opening 22 in the direction of arrow D. Then, after a certain period of time had elapsed, the residual water percentage in the cell 20 was measured. In this embodiment, the residual water rate was measured by changing the angle by one degree between zero and seven degrees. Further, the residual water rate was measured after 5 seconds and 10 seconds had passed since the energy absorber 10 was rotated. Note that the residual water rate was calculated by measuring the amount of water present inside the cell 20. Table 1 below shows the values of the measurement results. FIG. 5 shows a graph created based on the values in Table 1 that shows the relationship between the elapsed time and the residual water percentage inside the cell 20 for each angle.

TABLE 1

| | 0° | 1° | 2° | 3° | 4° | 5° | 6° | 7° |
|---|---|---|---|---|---|---|---|---|
| 0 seconds | 100% | 100% | 100% | 100% | 100% | 100% | 100% | 100% |
| 5 seconds | 18.5% | 17.8% | 13.3% | 7.4% | 4.4% | 4.4% | 3.7% | 3.7% |
| 10 seconds | 17.0% | 17.8% | 8.9% | 6.7% | 4.4% | 3.7% | 3.7% | 3.7% |

As shown in Table 1 and FIG. 5 above, the residual water rate was 10% or less at both 5 seconds and 10 seconds when the downward slope angle θ1 of the lower surface 26 of the cell 20 was three degrees or more. That was the case.

Effects of First Embodiment

Next, the effects of the first embodiment will be explained.

In the energy absorber 10 according to the first embodiment, when the body portion 12 is installed in a vehicle, a plurality of cells 20 provided in the body portion 12 have openings 22 on the outside in the vehicle width direction, and when viewed from the rear side of the vehicle. The lower surface 26 has a downward slope of three degrees or more from one end portion 20A on the inner side in the vehicle width direction to the other end portion 20B on the outer side in the vehicle width direction. Therefore, when the vehicle passes through the electrodeposition coating line, the electrodeposition liquid is discharged from the inside of the cell 20 due to the lower surface 26 having a downward slope of three degrees or more. Thereby, it is possible to suppress the electrodeposition liquid from remaining inside the cell 20.

Further, in the energy absorber 10 according to the first embodiment, the downward slope of the lower surface 26 of the cell 20 is set uniformly. Therefore, the electrodeposition liquid can be smoothly discharged along the lower surface 26 of the cell 20.

Second Embodiment

Hereinafter, an energy absorber 10A according to a second embodiment of the present disclosure will be explained using FIG. 6. In addition, in the energy absorber 10A of the second embodiment shown in FIG. 6, the same parts as in the first embodiment are denoted by the same reference numerals, and the description thereof will be omitted. In the energy absorber 10A of the second embodiment shown in FIG. 6, only the points different from the first embodiment will be explained.

Figure 6:
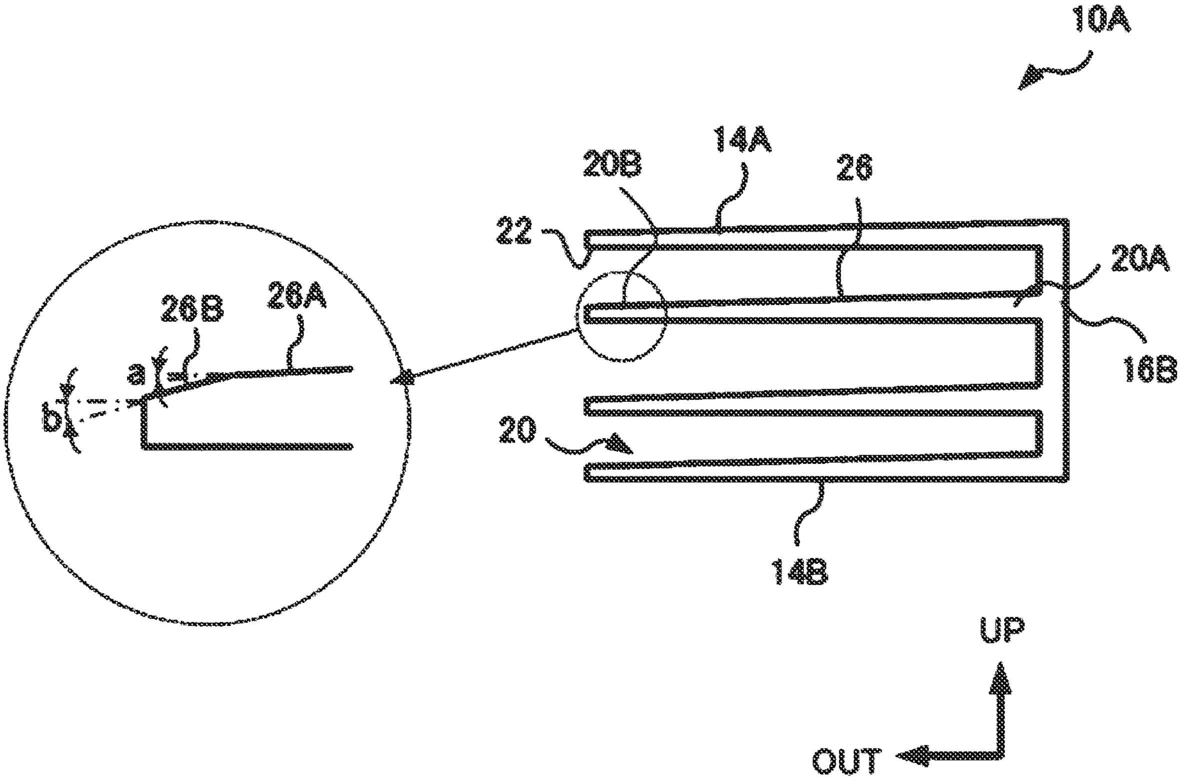
FIG. 6 is a sectional view corresponding to FIG. 2 of an energy absorber according to a second embodiment of the present disclosure, and an enlarged sectional view showing the main part.

As shown in FIG. 6, in the energy absorber 10A of the second embodiment, the lower surface 26 of the cell 20 has a different downward slope from one end portion 20A to the other end portion 20B. In the second embodiment, the downward slope of the lower surface 26 is set to change in stages. Specifically, as an example, the lower surface 26 has a first lower surface 26A on the one end portion 20A side and a second lower surface 26B on the other end portion 20B side. Further, the lower surface 26 has a downward slope that is larger on the outer side in the vehicle width direction than on the inner side in the vehicle width direction. Specifically, the downward slope of the first lower surface 26A is an angle a. The downward slope of the second lower surface 26B is an angle b. The first lower surface 26A and the second lower surface 26B are configured such that b>a.

Effects of Second Embodiment

Next, the effects of the second embodiment will be explained.

In the energy absorber 10A according to the second embodiment, the lower surface 26 of the cell 20 has different downward slopes from the one end portion 20A toward the other end portion 20B, and the lower surface 26 has a larger downward slope toward the outer side in the vehicle width direction than the inner side in the vehicle width direction. Therefore, the opening 22 side of the cell 20 has a larger downward slope. In addition, the electrodeposition liquid can be more easily discharged.

Moreover, the energy absorber 10A according to the second embodiment is set so that the downward slope of the lower surface 26 of the cell 20 changes in stages. Therefore, depending on the thickness of the lower wall constituting the lower surface 26, it is possible to easily discharge the electrodeposition liquid while maintaining the strength of the cell 20.

Third Embodiment

Hereinafter, an energy absorber 10B according to a third embodiment of the present disclosure will be explained using FIG. 7. In addition, in the energy absorber 10B of the third embodiment shown in FIG. 7, the same parts as in the first embodiment are indicated by the same reference numerals, and the description thereof will be omitted. In the energy absorber 10B of the third embodiment shown in FIG. 7, only the points different from the first embodiment will be explained.

Figure 7:
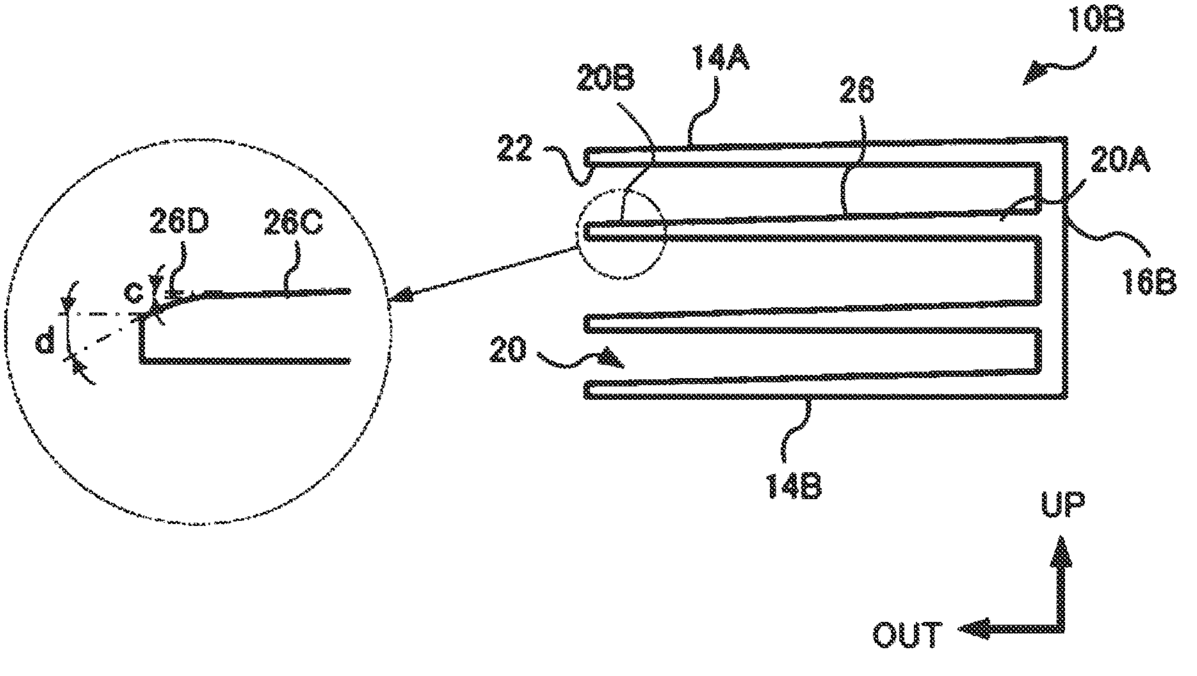
FIG. 7 is a sectional view corresponding to FIG. 2 of an energy absorber according to a third embodiment of the present disclosure, and an enlarged sectional view showing the main part.

As shown in FIG. 7, in the energy absorber 10B of the third embodiment, similarly to the second embodiment, the lower surface 26 of the cell 20 has a different downward slope from one end portion 20A to the other end portion 20B. In the third embodiment, the downward slope of the lower surface 26 is set to gradually change. Specifically, as an example, the lower surface 26 has a third lower surface 26C on the one end portion 20A side and a fourth lower surface 26D on the other end portion 20B side. Further, the lower surface 26 has a downward slope that is larger on the outer side in the vehicle width direction than on the inner side in the vehicle width direction. Specifically, the downward slope of the third lower surface 26C is an angle c. The downward slope of the second lower surface 26B is configured such that the angle gradually increases from angle c to angle d (d>c). That is, the third lower surface 26C is not formed in a flat shape but in a substantially curved shape.

Effects of Third Embodiment

Next, the effects of the third embodiment will be explained.

In the energy absorber 10B according to the third embodiment, the lower surface 26 of the cell 20 has different downward slopes from the one end portion 20A toward the other end portion 20B, and the lower surface 26 has a larger downward slope toward the outer side in the vehicle width direction than the inner side in the vehicle width direction. Therefore, the opening 22 side of the cell 20 has a larger downward slope. In addition, the electrodeposition liquid can be more easily discharged.

Furthermore, in the energy absorber 10B according to the third embodiment, the downward slope of the lower surface 26 of the cell 20 is set to gradually change. Therefore, depending on the thickness of the lower wall constituting the lower surface 26, it is possible to easily discharge the electrodeposition liquid while maintaining the strength of the cell 20.

In addition, in the embodiment mentioned above, two lower surfaces are provided as the lower surface 26 having different downward slopes. However, the present disclosure is not limited to this. The present disclosure may have more than three lower surfaces.

Further, in the embodiment described above, the upper surface 14A of the body portion 12 also has a downward slope similarly to the lower surface 26 of the cell 20. However, the present disclosure is not limited to this. The present disclosure does not need to have a downward slope.

Further, in the embodiment described above, the number of cells 20 was 54. However, the present disclosure is not limited to this. The number of cells 20 may be any number. For example, the cells 20 may be provided in two stages in the vehicle vertical direction on the front surface 12B of the body portion 12, or may be provided in five stages.

An embodiment of the present disclosure has been described above. However, the disclosure is not limited to these embodiments. One embodiment and various modified examples may be combined as appropriate. It goes without saying that the present disclosure can be implemented in various ways without departing from the spirit of the disclosure.

What is claimed is:

1. An energy absorber comprising:

a body portion made of a resin and assembled in a metal closed space of a vehicle, the vehicle being subjected to an electrodeposition coating process; and a plurality of cells provided in the body portion and each including an opening on an outer side in a vehicle width direction with the body portion assembled to the vehicle, the cells each including a lower surface having a downward inclination angle of three degrees or more from a first end portion on an inner side in the vehicle width direction toward a second end portion on the outer side in the vehicle width direction as seen from a rear side of the vehicle, wherein the lower surface includes an inner portion and an outer portion such that the downward inclination angle at the outer side is greater than that at the inner side, the downward inclination angle in the inner portion being constant, and the downward inclination angle in the outer portion gradually increasing toward the second end portion.

2. The energy absorber according to claim 1, wherein the outer portion of the lower surface is formed as a curved surface.

* * * * *